US008531734B2

(12) United States Patent
Mestha et al.

(10) Patent No.: US 8,531,734 B2
(45) Date of Patent: Sep. 10, 2013

(54) CLUSTER MODEL FOR CONTROLLING COLOR IN A COLOR MARKING DEVICE

(75) Inventors: Lalit Keshav Mestha, Fairport, NY (US); Edul N. Dalal, Webster, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 327 days.

(21) Appl. No.: 13/023,202

(22) Filed: Feb. 8, 2011

(65) Prior Publication Data

US 2012/0200897 A1 Aug. 9, 2012

(51) Int. Cl.
*G06T 5/00* (2006.01)
(52) U.S. Cl.
USPC .......................................................... 358/3.27
(58) Field of Classification Search
USPC ............. 358/3.27, 1.9, 1.18, 3.26, 3.29, 1.15; 382/268, 275, 205
See application file for complete search history.

(56) References Cited

U.S. PATENT DOCUMENTS

| 7,383,261 | B2 | 6/2008 | Mestha et al. |
| 7,839,498 | B2 | 11/2010 | Mestha et al. |
| 2009/0296107 | A1 | 12/2009 | Mestha et al. |
| 2012/0154831 | A1* | 6/2012 | Wu et al. ........................ 358/1.9 |

OTHER PUBLICATIONS

Wu, et al., "Image Quality Performance for a Color Marking Device", U.S. Appl. No. 12/727,692, filed Mar. 19, 2010.
Dalal, et al., "Color Mapping Determination for an N-Color Marking Device Based Upon Color Stability", U.S. Appl. No. 12/727,760, filed Mar. 19, 2010.
Dalal, et al., "Color Mapping Determination for an N-Color Marking Device Based Upon Image Spatial Noise Defects", U.S. Appl. No. 12/727,791, filed Mar. 19, 2010.
Wu, et al., "Updating an Image Quality Metric Database to Account for Printer Drift", U.S. Appl. No. 12/781,988, filed May 18, 2010.
Schwarz, Gideon, "Estimating the Dimension of a Model", The Annals of Statistics, 1978, vol. 6, No. 2, 461-464.
Bensmail, et al., "Inference in model-based cluster analysis", Statistics and Computing (1997) 7, 1-10.
Boyden III, et al., "Tree-based Cluster Weighted Modeling: Towards a Massively Parallel Real-Time Digital Stradivarius", Physics and Media, MIT Media Lab, Dec. 12, 1997.
Wu, et al., Updating a Smoothness Constrained Cluster Model for Color Control in a Color Management System, U.S. Appl. No. 12/969,854, filed Dec. 16, 2010.
Mestha, et al., "Attribute Driven Gamut Mapping Via a Minimized Multi-Objective Cumulative Cost Function", U.S. Appl. No. 12/942,414, filed Nov. 9, 2010.
Wu, et al., "Optimal Spot Color Recipes Using Variable GCR Profiles", U.S. Appl. No. 12/902,669, filed Oct. 12, 2010.
Mestha, et al., "Reducing Noise Induced by Color Mixing Spot Color Recipe Search", U.S. Appl. No. 12/581,566, filed Oct. 19, 2009.

* cited by examiner

*Primary Examiner* — Charlotte M Baker
(74) *Attorney, Agent, or Firm* — Philip E. Blair; Fleit Gibbons Gutman Bongini & Bianco P.L.

(57) ABSTRACT

What is disclosed is a system and method for improving image quality of a color of interest using a cluster model in a color printing system involving the following. First, one or more image quality attributes are selected for a target color marking device. A cluster model is received which comprises a plurality of clusters with each cluster having an associated transform. The cluster model is used to estimate an image quality parameter. The image quality parameter is used to select colorant sets and thereby to improve the image quality in the marking device. Various embodiments of the use of cluster models are disclosed.

12 Claims, 8 Drawing Sheets

CLUSTER MODEL FOR CONTROLLING COLOR IN A COLOR MARKING DEVICE

TECHNICAL FIELD

The present invention is directed to systems and methods for improving image quality performance in a color marking device.

BACKGROUND

Empirical or interpolation-based approaches treat print devices as a black box between inputs and outputs. Analytical first principle approaches attempt to characterize the device color response using the fewest number of measurements to arrive at analytical functions that physically represent the process. Both approaches are capable of predicting the response of the device for a variety of input images. However, as the number of color separations increases and/or the number of output parameters increase, analytical first principle models require more time and effort to develop. Instead, empirical data-rich methods are utilized. There are advantages in such an approach such as, for example, the ability to better represent the response of a color marking device.

Methods have arisen which attempt to maintain both accuracy and consistency of spot colors while determining optimal color recipes that can provide improved smoothness. All these use either a smoothness model to estimate the smoothness parameters or an insitu full width array (FWA) sensor to measure smoothness so that unwanted image artifacts are minimized. By constraining the color recipe to numerous measurable/predictable image quality parameters, smoothness can be improved in digital color printers. As such, it is useful to introduce additional modeling constraints such that the color recipe becomes unique resulting in the desired output color having improved smoothness.

INCORPORATED REFERENCES

The following U.S. Patents, U.S. Patent Applications, and Publications are incorporated herein in their entirety by reference.

"Image Quality Performance For A Color Marking Device", U.S. patent application Ser. No. 12/727,692, by Wu et al.

"Updating A Smoothness Constrained Cluster Model For Color Control In A Color Management System", U.S. patent application Ser. No. 12/969,854, by Wu et al.

"Attribute Driven Gamut Mapping Via A Minimized Multi-Objective Cumulative Cost Function", U.S. patent application Ser. No. 12/942,414, by Mestha et al.

"Optimal Spot Color Recipes Using Variable GCR Profiles", U.S. patent application Ser. No. 12/902,669, by Wu et al.

"Reducing Noise Induced By Color Mixing Spot Color Recipe Search", U.S. patent application Ser. No. 12/581,566, by Mestha et al.

"*Digital Color Imaging Handbook*", 1st Ed., CRC Press (2003), ISBN-13: 97808-4930-9007.

BRIEF SUMMARY

What is disclosed is a novel system and method for improving image quality in a color printing system. In one embodiment, an image quality attribute is first selected. The selected image quality attribute has been identified for a target color marking device. The color marking device has a corresponding colorant set. A cluster model is received. The cluster model is a plurality of clusters each having an associated transform and each having an associated model in a region of color space for which the model applies. The cluster model has been generated offline from measurements obtained from test patches printed with colors of the colorant set using the color marking device and color measurements taken from those printed patches, and from image quality measurements taken at nominal process setpoints and/or other setpoints appropriately for the color marking device of interest. The cluster model is then used, in a manner more fully described herein, to estimate an image quality parameter. The image quality parameter is used to monitor the selected image quality attribute in the color marking device. Embodiments of cluster models when used for print engines with xerographic and Solid Inkjet (SIJ) printing technologies are disclosed. The cluster models presented are locally linear which contain a data matrix and centroid corresponding to each cluster. The number of clusters is generated during offline model generation process. Mottle reduction was found to be significant in the xerographic printer. Graininess reduction was considered significant for Solid Inkjet Printers.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

A "Cluster Model", as used herein, is a model which defines a plurality of clusters, each defined by a boundary surface, in an n-dimensional color space. Each cluster can be identified by a centroid or by its boundary surface. In the case of clusters identified by centroids, a distance measure is used to determine a nearest center. The cluster model may contain information about the distance measure and/or similarity measures used for clustering. It may also contain statistical information regarding data distribution such as the covariance matrix. Each cluster has an associated transform function, as defined above. Without loss of generality, a cluster model is a data-driven or an algorithmic-based approach operating on a set of experimental input-output map—a nonlinear prediction of dependent variables (outputs) from a set of independent variables (inputs) based upon some density estimation using a set of clusters that are each notionally appropriate in a sub-region of the input space. This density might be a Gaussian centered at a parameter representing the cluster center. In the same way as for regression analysis, it will be important to consider preliminary data transformations as part of the overall modeling strategy if the core components of the model are to be simple regression models for the cluster-wise densities, and normal distributions for the cluster-weighting densities. The number of clusters is discoverable using latent class models to find relevant patterns in high-dimensional data.

A "Centroid" of an object X in n-dimensional space is the intersection of all hyperplanes that divide object X into parts of equal moment about the hyperplane. Informally, it is the average of all points of X and defines a 'center' of the object. For an object of uniform composition, the centroid of an object is the object's center of mass. Standard integrations for calculating a centroid are as follows:

$$C_y = \frac{\int y \, dA}{A} \text{ and } C_x = \frac{\int x \, dA}{A} \ldots$$

where $C_x$ is the distance from the y-axis to the centroid, $C_y$ is the distance from the x-axis to the centroid, such that the coordinates of the centroid are $(C_x, C_y)$. The reader is directed to the following texts, *Handbook of Mathematics* $5^{th}$ Ed., Springer (2007), ISBN-13: 978-3540721215, and *CRC Standard Mathematical Tables and Formulae*, $31^{st}$ Ed., Chapman and Hall (2002), ISBN-13: 978-1584882916, and/or Example 7.1 of: *Control of Color Imaging Systems: Analysis and Design*, CRC Press (2009), ISBN-13: 97808-4933-7468, all of which are incorporated herein in their entirety by reference.

An "Associated Transform" is a matrix transformation which is associated with a given centroid. The transform associated with a given cluster represents the linear transfer relationship between colorants to the image quality parameters given a set of one or more image quality attribute, as defined herein further. In one embodiment, this transfer relationship is represented as a regression matrix. Regression on input colorants to output image quality parameters is one approach by which the transformation matrix is constructed. Other methods may be performed using, for example, estimation theory in the factory.

An "Image Quality Attribute" is a mathematical definition for determining a given image quality defect, such as, for instance, graininess, mottle, banding, streaking, and temporal color variation (color stability). The term image quality attribute can also be used to describe the underlying variation of raw color data from which higher-level metrics can be derived. As used herein, image quality attributes are any combination of color stability, mottle, graininess, visual noise, visible screen artifacts, and a smoothness measure as defined by: *International Print Quality Standard—ISO/IEC 13660:2001* which specifies device-independent image quality metrics, measurement methods, and analytical procedures used to describe a quality of an image output from a document reproduction device.

"Color Stability" is an image quality attribute attributable to, for example, photoreceptor or charging device non-uniformity, variation in temperature or humidity, age of the photoreceptor unit, age of an individual toner color, or other like environmental and/or mechanical factors. Changes in media weight or mechanical alignment of the machine components may result in color-to-color registration errors, and can impact color stability.

"Graininess" is the a-periodic fluctuation of density at a spatial frequency greater than 0.4 cycles per millimeter in all directions. Other definitions, such as with different spatial frequency ranges and/or measuring fluctuation at different color space (e.g. L* rather than density), exist as well. Methods to quantify graininess are well established.

"Mottle" consists of the irregular arrangement of patches of color on an output print due to defective toner transfer from the belt to the image forming surface. Mottle is similar to graininess, but on a larger spatial scale (>250 μm). Various metrics have been developed by vendors, some proprietary, which are used to determine lightness variation of mottle.

"Visual Noise and Visible Screen Artifacts" are any visually perceptible pseudo-random defects. Such defects may arise, for instance, from a non-uniform LED imager, contamination of voltage elements in the charger, and the like.

A "Color Marking Device" refers herein to a wide variety of print system device architectures such as, for instance, monochrome or color digital document reproduction architectures, document scanning systems, digital printing presses, and other multi-function document reproduction systems. Such systems generally include a display device such as a CRT or touch screen along with one or more user interfaces such as a keyboard, mouse, keypad, touchpad, and the like, for entering data and configuring device-specific settings to optimize image quality and performance. One example color marking device is shown at 318 of FIG. 3. A color marking device may include an image processing system which performs the methods described herein. The image processing system can be hardware and/or software which may reside in the image path of the device.

Figure 1A:
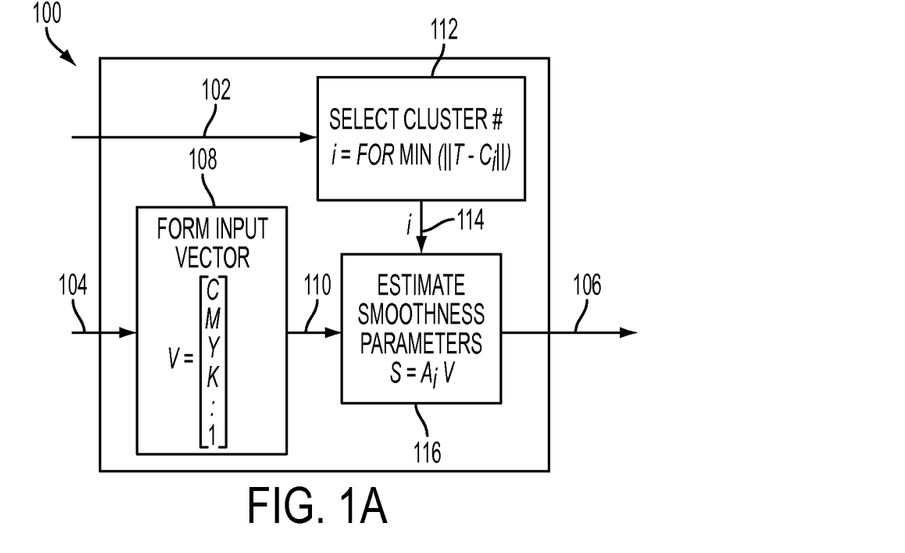
FIGS. 1A-B illustrate example cluster models used to generate estimated image quality parameters for a corresponding colorant set of color marking devices.
Figure 1B:
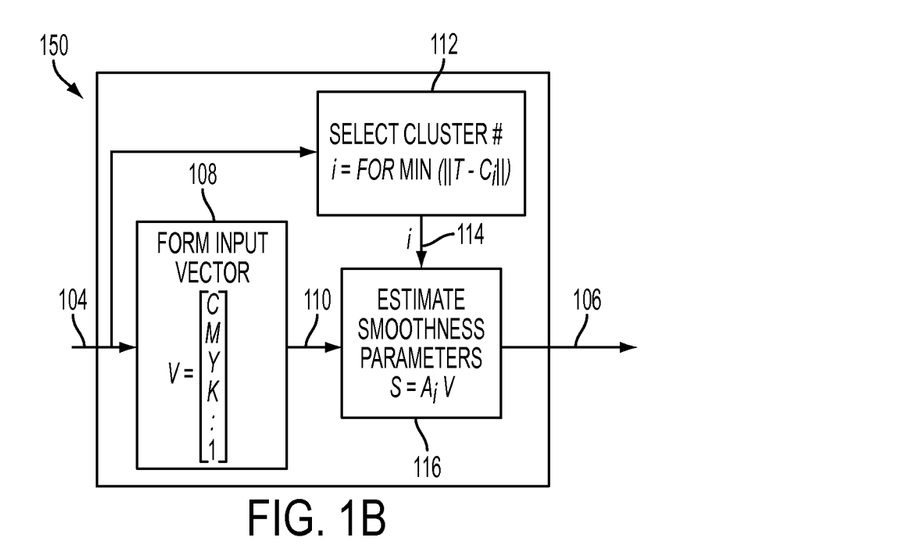

Reference is now being made to FIGS. 1A-B which illustrate example cluster models used to generate an estimated image quality parameter for a corresponding colorant set for color marking device. Similar components of each model are similarly numbered.

In FIG. 1A, model 100 receives a vector 102 comprising L*a*b* and optionally one or more image quality attributes, and CMYK (or a CMYK recipe) at 104 and generates an estimated image quality parameter 106. Vector Formation Module 108 forms vector 110 from input CMYK 104. Cluster Selection Module 112 selects the cluster that input 102 belongs to and outputs the cluster index i (114). Vector $C_i$ is the $i^{th}$ centroid. In FIG. 1A, vector T is comprised of L*a*b* values and optionally an image quality attribute(s) to which cluster assignment is required. If an affine model is used in the construction of the cluster model then vector T and vector $C_i$ both contain a numeric "1". Clustering is performed using a k-means algorithm in output space with offline experiments. Estimation Module 116 uses regression matrix $A_i$ associated with the $i^{th}$ cluster and vector V (110) to estimate the image quality parameter 106.

In FIG. 1B, model 150 receives CMYK 104 into both 108 and 112, and vector T does not contain L*a*b* nor any image quality attribute(s). Instead, Vector T comprises elements of vector V (110). A numeric "1", is included in both T and V vectors if an affine model is used in the construction of the cluster model. Cluster centroids are computed in CMYK space and cluster assignment is performed by comparing distances between centroids and vector T. Clustering is performed using a K-means algorithm in input space with offline experiments.

In both models of FIGS. 1A and 1B, output vector 106 is calculated with the operation, $S=A_i V$, where $A_i$ is a matrix of model parameters, and V is the input column vector $[C\,M\,Y\,K\,\ldots 1]^t$ for an affine model for a N-color marking device where N=4, and superscript "t" means transpose. It should be appreciated that this vector will be large for N-color devices where $N \geq 8$. Higher order terms (e.g., quadratic as in $C^2$, $M^2$ etc., or interactive terms as in CM, MY, etc.,) can used in the input column vector when higher accuracy is called for. Established recursive methods for updating the regression matrix $A_i$ can be employed as new measurements/observations from critical test-patches become available.

Figure 2:
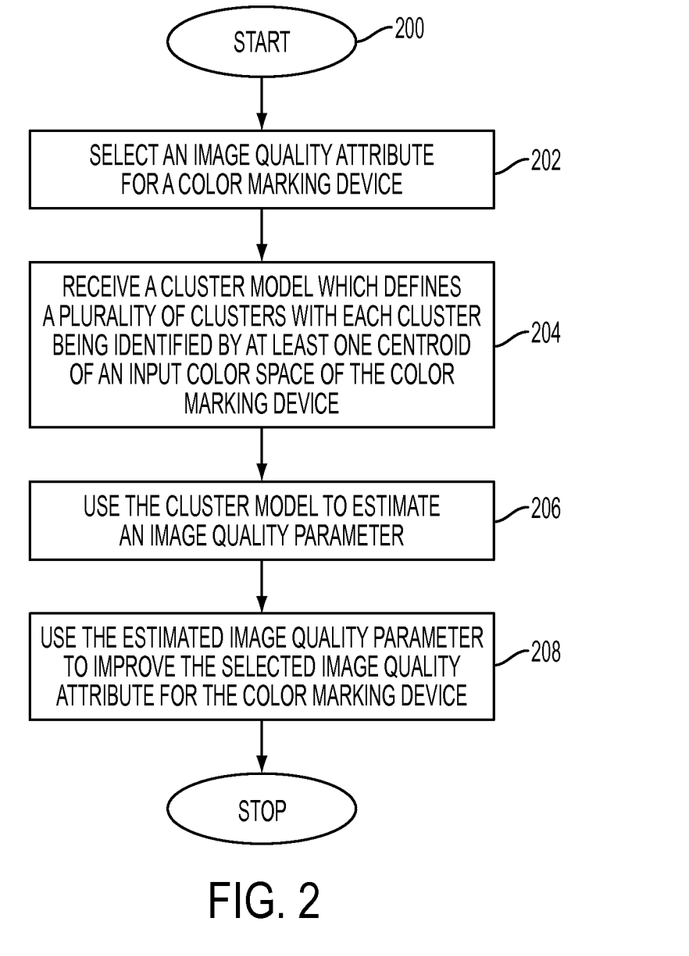
FIG. 2 is a flow diagram which illustrates one example embodiment of the present method for improving image quality in a color printing system.

Reference is now being made to the flow diagram of FIG. 2 which illustrates one example embodiment of the present method for improving image quality in a color printing system. Flow processing begins at 200 and immediately proceeds to step 202.

At step 202, an image quality attribute is selected which has been identified for a target color marking device. The selected image quality attribute can be any of the above-described image quality attributes. These may be selected automatically or, for instance, by a user using a graphical user interface of a computer workstation. One such computer system 302 is shown and discussed with respect to the networked configuration of FIG. 3.

At step 204, a cluster model is received. The cluster model defines a plurality of clusters and matrices. Each cluster is identified by at least one centroid in an input color space of the color marking device. Each cluster also has an associated transform such as, for example, a regression matrix. The cluster model has at least one critical cluster having at least one critical color which can be used to monitor the image quality attribute. The cluster model is designed in the factory using measurement data obtained over a training color set containing a relatively small set of colors (e.g., 1200) which have been printed using the color marking device and measured using a spectrophotometer or other color measuring device, and image quality measurements taken for the selected image quality attribute at nominal and/or appropriately chosen process setpoints using appropriately chosen image quality parameter measuring sensor(s) (for example, a color document scanner). Measurements may also be obtained at different process setpoints. If the number of process setpoints is large, then a large dataset is created which can be used to construct the cluster model using a K-means algorithm. A user may enter information pertaining to some or all of the cluster model, critical colors, boundary edges, centroids, associated transforms, and the like, using the input device 308 of computer workstation 302 of FIG. 3. The cluster model can be received from a computer system or retrieved from a storage device 316 or provided from a remote device over a wired or wireless network such as network 303.

At step 206, the cluster model is used to estimate an image quality parameter. The estimated image quality parameter(s) can be saved to a storage device such as a hard disk or memory, or communicated to a remote device over a network.

At step 208, the estimated image quality parameter is used to improve the identified image quality attribute in the color marking device. In one embodiment, the estimated image quality parameter is used to monitor the image quality attribute in the color marking device. The user is then informed of an expected image quality error. The cluster model may be updated based upon a threshold event having occurred such as, for example, a print engine of the color marking device having drifted beyond a predetermined amount, or a passage of a predetermined amount of time. Updating the cluster model is more fully disclosed in the above-referenced co-pending U.S. patent application by Wu et al, entitled: "Updating A Smoothness Constrained Cluster Model For Color Control In A Color Management System".

Figure 3:
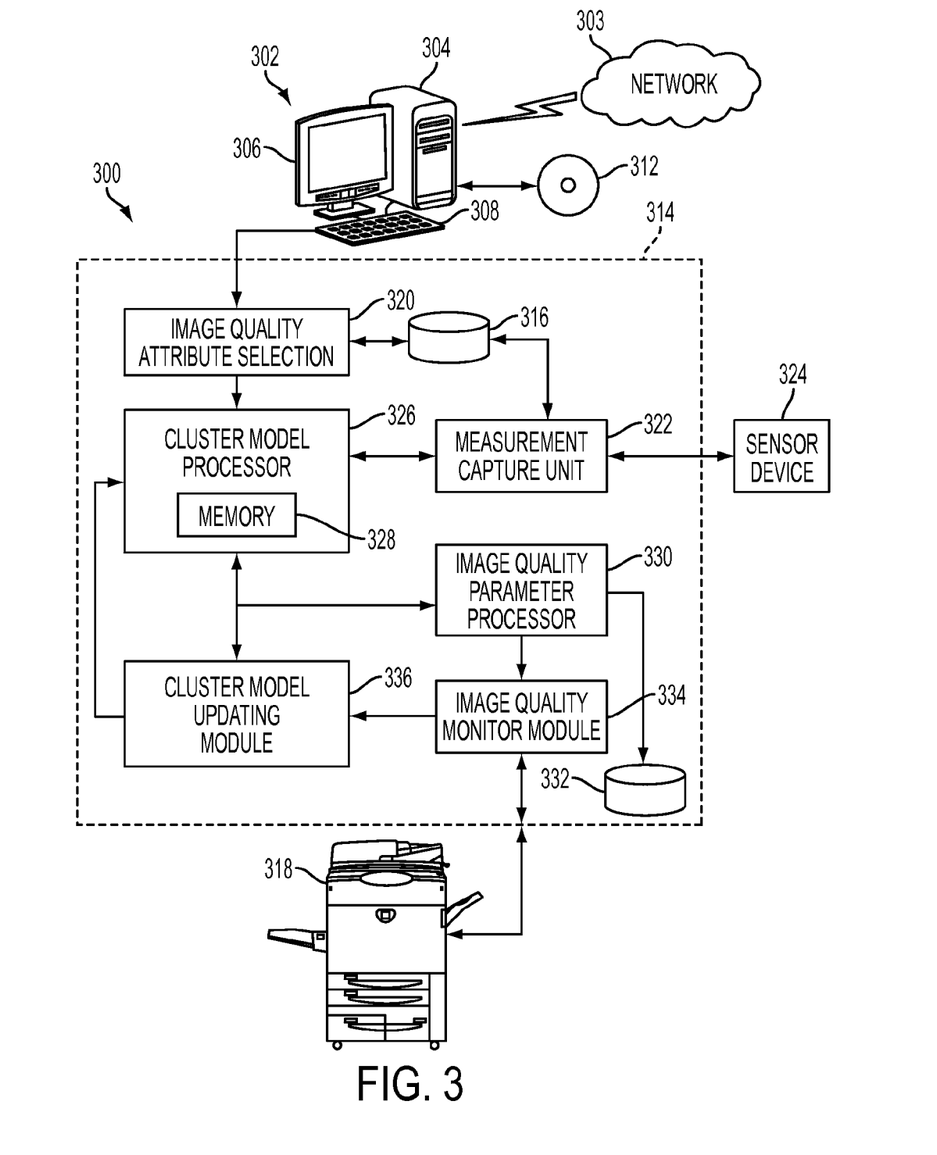
FIG. 3 is a block diagram of an example system for performing various aspects of the present method as described in the flow diagram of FIG. 2.
Figure 4:
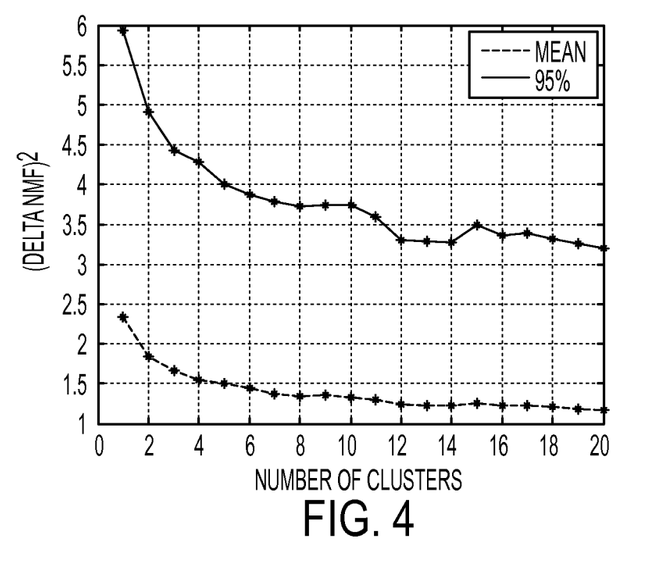
FIGS. 4-7 show model prediction results for a xerographic print engine.
Figure 5:
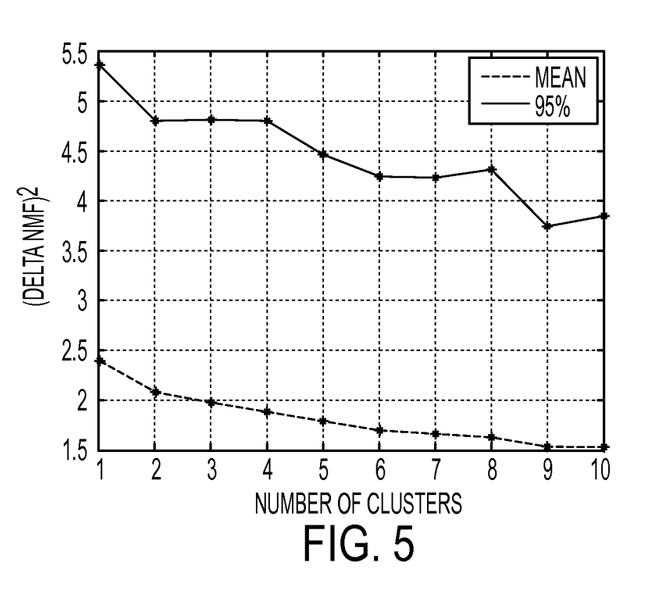
Figure 6:
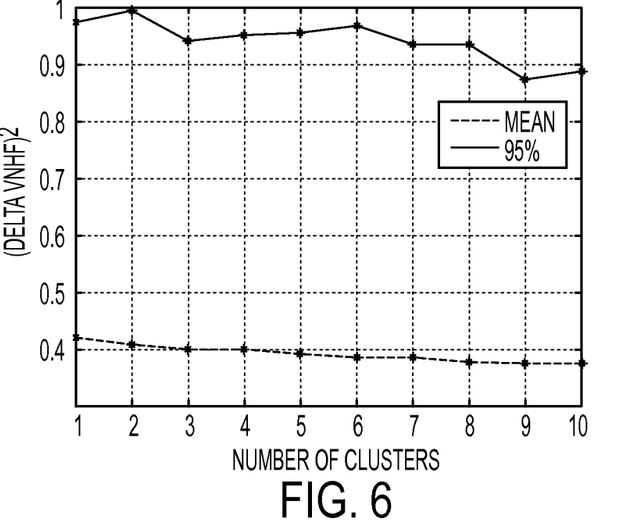
Figure 7:
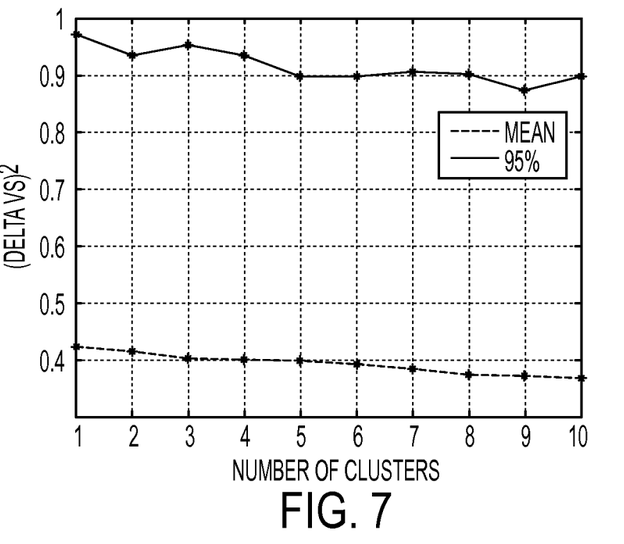

Reference is now being made to FIG. 3 which illustrates a block diagram of an example system for performing various aspects of the present method as shown and described with respect to the flow diagram of FIG. 2.

System 300 is shown generally comprising a computer workstation 302 capable of receiving a user input and providing that selection to color management system 314 which, in turn, comprises a plurality of modules. Computer 302 comprise a case 304 housing a motherboard, central processor unit (CPU), memory, network interface, one or more storage devices, and a communications link such as a network card to effectuate communication to remote devices over network 303. Workstation 302 also includes a graphical display 306 such as a CRT or LCD monitor, a keyboard 308, and a mouse (not shown) to enable a user to make a selection or identification as discussed above or to enter information about the cluster model. The workstation includes a media 312, such as a hard disk drive or CD-ROM, for storage of machine readable program instructions and executable programs and data for implementing various aspects of the methods described herein. The workstation can store/retrieve information to/from media 312 using R/W drive 310. The workstation is connected to one or more remote devices via network 303 over which values, records, and other data can be transmitted and/or received. Techniques for placing computer workstations in communication with remote devices over a network are well established and commonly understood. Data packets are transmitted using servers connected via a plurality of communication links. Data is transferred in the form of signals which may be, for example, electrical, electronic, electro-magnetic, optical, or other signals. These signals are transmitted by wire, cable, fiber optic, phone line, cellular link, RF, satellite, or any other medium or communications link known in the arts. Computer 302 may further execute server software or house server hardware. Server software and hardware are readily available from a variety of vendors in commerce. The computer system can be a personal computer or comprise any computing device capable of performing image processing operations in accordance herewith through hardware and/or software applications. System 300 is shown further comprising a color marking device 318. Such a marking device is capable of reducing a signal of an image to a viewable form. Reducing an image of a document to a viewable form includes transmitting the image in the form of signals over a network connection, interface, or other communication pathway, for rendering. The step of providing the image to an output device is also intended to include storing those signals for subsequent retrieval.

Networked workstation 302 also includes database 316 for retrieving data records in response to a query. The database is capable of adding new data records, updating records, and displaying stored data and other information made available by the database engine. Since database construction, query optimization, indexing methods, and record retrieval techniques and algorithms are well known in the arts, a further discussion as to a specific database implementation is omitted. One of ordinary skill would be able to obtain a database engine known in the arts and place the database in communication with workstation 302 and print device 318. It should be appreciated that database 316 can be placed in communication with any of the devices or modules shown. The illustrated implementation is but one configuration. Values, attributes, mathematical routines, color recipes, color values, image quality parameters, look-up tables, and the like, may be retrieved by any of the illustrated modules from the database.

Attribute Selection Module 320 enables a user to select or otherwise identify at least one image quality attribute of interest intended to be processed in accordance with the teachings hereof as described above with respect to step 202 of the flow diagram of FIG. 2. In this embodiment, the selected image quality attribute is identified for target color marking device 318. The selected image quality attribute can be any of the above-described image quality attributes. The image quality attribute can be received from computer workstation 302, or retrieved from storage device 316, or obtained from a remote device over network 303. A user may enter information pertaining to the image quality attribute or any of the parameters as defined herein using graphical user interface 306 and 308 of workstation 302. The image quality attribute may be retrieved from computer media 312.

Measurement Capture Unit 322 receives, captures, or otherwise processes, measurement data taken using, for example, an inline or offline color measurement device 324 such as a spectrophotometer or colorimeter. Measurement data may be retrieved from storage device 316 or received from a remote device over network 303. Various values, functions, formulae, or parameters relating to measurement data may be entered by a user using keyboard 308 and display 306 of a computer workstation 302.

Cluster Model Processor 326 receives the cluster model designed for target color marking device 318. A user may enter information pertaining to some or all of the cluster model, clusters, critical colors, boundary edges, centroids, associated transforms, and the like, using input device 308 of workstation 302. The cluster model can be received from a computer system or retrieved from a storage device or from a remote device over a wired or wireless network 303 such as the Internet. Cluster Processor 326 may further obtain variables, parameters, functions, formulae, and the like, from storage device 316 or from media 312. Interim results may be stored in storage unit 316. Cluster processor module utilizes, in this embodiment, a resident memory 328 to store temporary results and to facilitate cluster processing. Computer readable program instructions for performing cluster analysis and processing may be stored and retrieved from resident memory 328 or retrieved from workstation 302 or from a remote device over network 303. Cluster processor 326 can convert one or more color values of the corresponding colorant set into an input vector V and calculates distance between centroids and the input vector V such that a minimum distance can be determined and the index of a specific cluster determined. The identified cluster can be stored to device 316 or communicated to print device 318.

Parameter Processor Module 330 receives the generated cluster model and estimates one or more image quality parameters based on the selected image quality attribute. The estimated image quality parameters can be saved to storage device 332, or communicated to a remote device over network 303.

Image Quality Monitor Module 334 receives the estimated image quality parameters from module 330. Module 334 is in communication with target color marking device 318 and used to monitor the image quality attribute in device 318. Module 334 further communicates with workstation 302 to inform the user of an expected image quality error. Cluster Model Updating Module 336 is in communication with Cluster Model Processor 326 and Monitor Module such that the cluster model may be updated based upon an event having occurred such as, for example, receiving a signal from Monitor Module 334 that a print engine of color marking device 318 has drifted beyond a predetermined amount. Monitor Module 334 may signal Updating Module 336 to update the cluster model based upon any number of threshold events having occurred or simply by a predetermined amount of time having lapsed since a last update.

It should be appreciated that any of the modules and processing units shown and described with respect to the block diagram of FIG. 3 are in communication with computer workstation 302, and some or all of the functionality described for any of these modules may be performed, in whole or in part, within workstation 302 or by a special purpose computer system. Various modules may designate one or more components which may, in turn, each comprise software and/or hardware designed to perform a specific function. A plurality of modules may collectively perform a single function and may comprise a single piece of hardware such as an ASIC, electronic circuit, or special purpose processor. Any of the modules are capable of reading machine executable program instructions. A plurality of modules may be executed by either a single special purpose computer system or a plurality of special purpose computer systems in parallel. One such special purpose computer system is shown and discussed herein further with respect to FIG. 11. Connections between modules includes both physical and logical connections. Modules may further include one or more software/hardware modules which may further comprise an operating system, drivers, device controllers, and other apparatuses some or all of which may be connected via a network.

It is contemplated that one or more aspects of the present method may be implemented on a dedicated computer system or workstation, and may also be practiced in distributed computing environments where tasks are performed by remote processing devices that are linked through a communication network. In a distributed computing environment, program modules for performing various aspects of the present system and method. Other embodiments include a special purpose computer designed to perform the methods disclosed herein.

Figure 8:
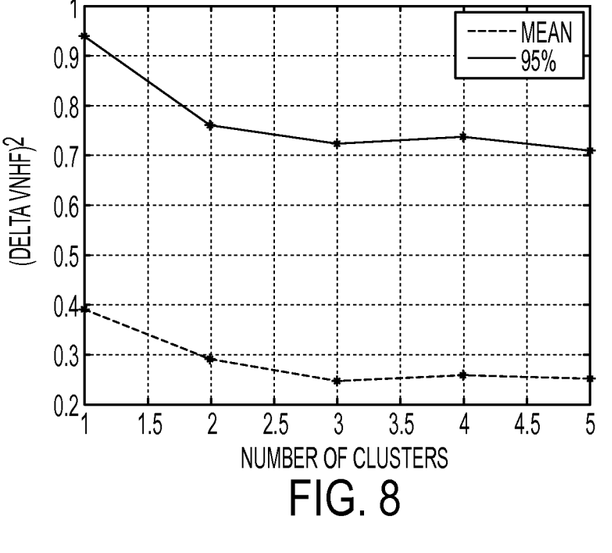
FIGS. 8-10 show model prediction results for a solid inkjet printer.
Figure 9:
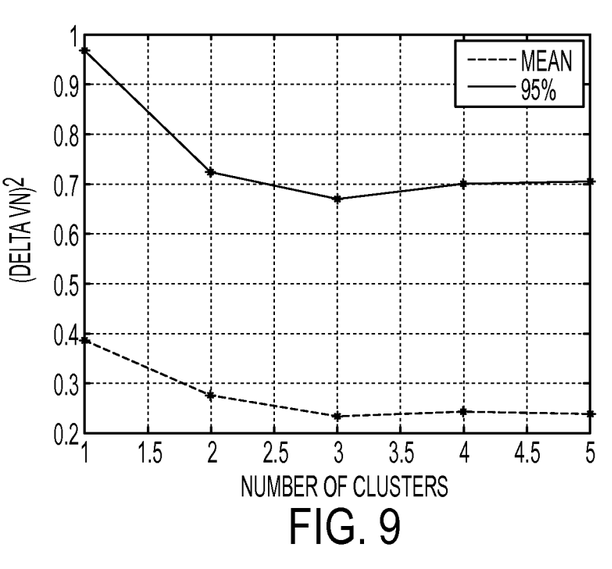
Figure 10:
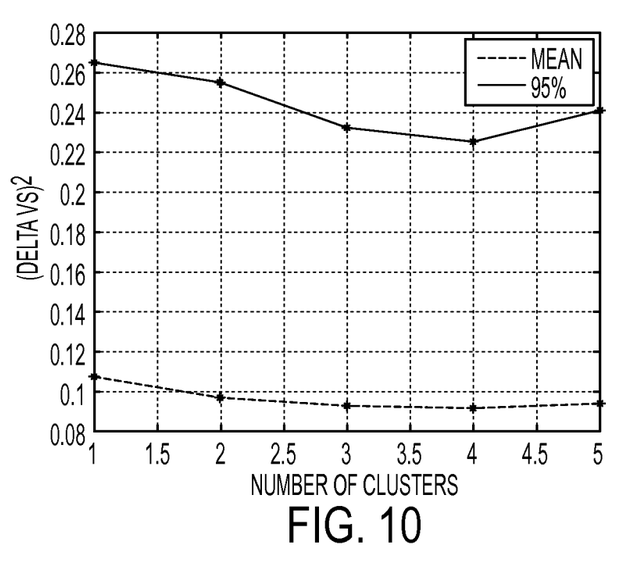

To demonstrate the efficacy hereof, two runs of smoothness testing on a xerographic print device were conducted. Note that these were part of an L12 screening experiment where printer drift was simulated by replacing a new photoreceptor-belt with an older one and varying xerographic settings such as process control targets, fuser temperature, and toner age. Smoothness and color models across a xerographic printer latitude were built from these measurements for the purpose of simulations and to assess benefit. FIGS. 4-7 show model prediction results for various image quality attributes in xerographic print engines. Variance plots are shown with respect to cluster numbers. Clearly, the cluster model improved image quality prediction accuracy. For an SIJ printer, an important smoothness parameter is graininess (measured by VNHF). FIGS. 8-10 show model prediction results for various image quality attributes in SIJ printer.

Figure 11:
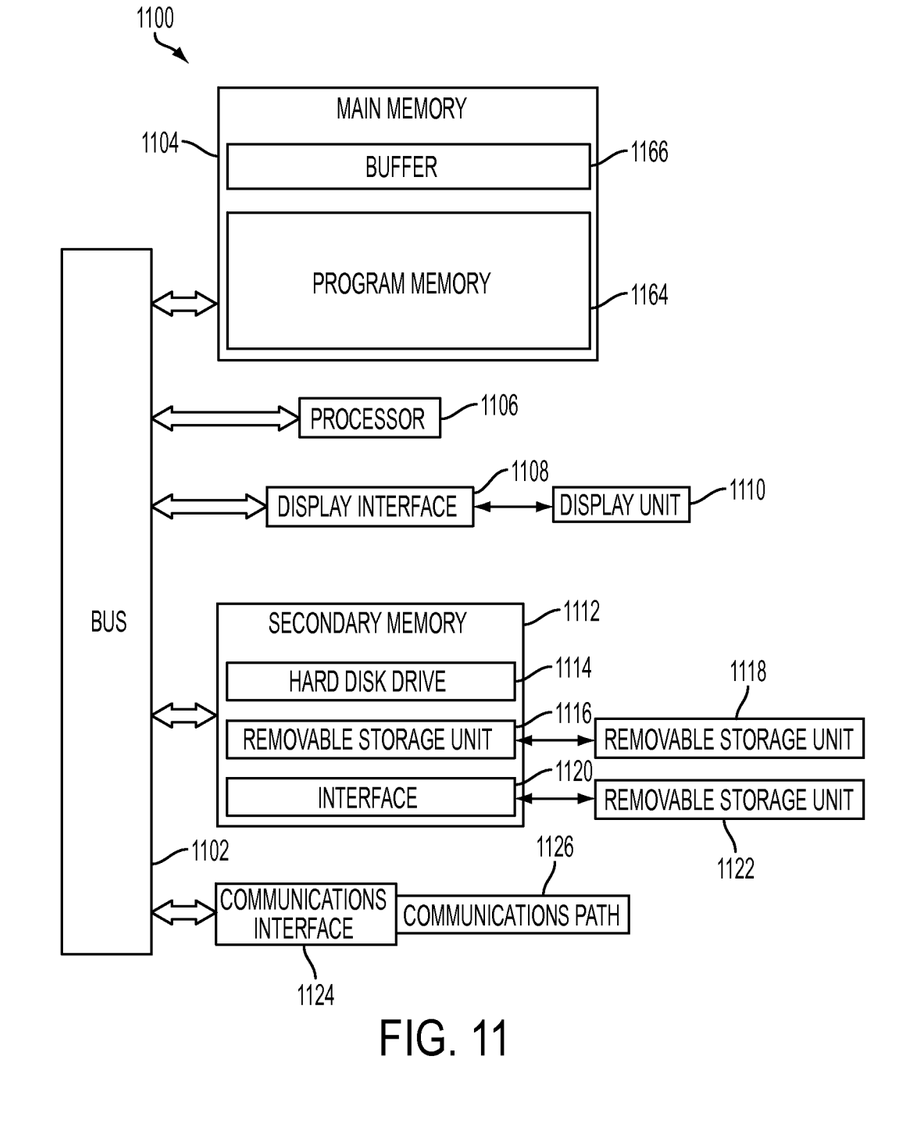
FIG. 11 illustrates a block diagram of one example embodiment of a special purpose computer system for performing one or more aspects of the present system and method as described with respect to the example flow diagram of FIG. 2 and the example functional block diagram of FIG. 3.

Reference is now being made to FIG. 11 which illustrates a block diagram of one example embodiment of a special purpose computer system for implementing one or more aspects of the present method as described with respect to the embodiments of the flow diagram of FIG. 2 and the block diagram of FIG. 3. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method.

Special purpose computer system 1100 includes processor 1106 for executing machine executable program instructions for carrying out all or some of the various aspects of the present method. The processor is in communication with bus 1102. The system includes main memory 1104 for storing machine readable instructions. Main memory may comprise random access memory (RAM) to support reprogramming and flexible data storage. Buffer 1166 stores data addressable by the processor. Program memory 1164 stores program instructions. A display interface 1108 forwards data from bus 1102 to display 1110. Secondary memory 1112 includes a hard disk 1114 and storage device 1116 capable of reading/ writing to removable storage unit 1118, such as a floppy disk, magnetic tape, optical disk, etc. Secondary memory 1112 further includes other mechanisms for allowing programs or other machine executable instructions to be loaded into the processor. Such mechanisms may include, for example, a storage unit 1122 adapted to exchange data through interface 1120 which enables the transfer of software and data to the processor. The system includes a communications interface 1124 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1126 which carries such signals and may be implemented using wire, fiber optic cable, phone line, cellular link, RF, memory, or other means known in the arts.

It should be appreciated that various of the above-disclosed and other features and functions, or alternatives thereof, may be desirably combined into many other different systems or applications. The above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Changes to the above-described embodiments may be made without departing from the spirit and scope of the invention.

The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications are each separately hereby incorporated by reference in their entirety.

What is claimed is:

1. A method for improving image quality performance of a color marking device, the method comprising:
    selecting at least one image quality attribute for a color marking device;
    selecting at least one colorant set from among available colorant sets such that said colorant set improves said selected image quality attribute; and
    using a cluster model for color management of said color marking device, said cluster model comprising a plurality of clusters, each cluster having an associated transform which relates said image quality attribute to said selected colorant set of said color marking device.

2. The method of claim 1, wherein said cluster model is designed for said color marking device, and is generated offline from measurements of said image quality attribute obtained from printed test patches and from color measurements obtained from said printed patches.

3. The method of claim 1, wherein each cluster of said cluster model is identified by a centroid in a selected color space.

4. The method of claim 3, wherein said selected color space is an input color space of said device.

5. The method of claim 3, wherein said selected color space is a device-independent color space.

6. The method of claim 1, wherein said selected colorant set is determined by an iterative process.

7. A system for improving image quality performance of a color marking device, the system comprising:
    a memory and a non-transitory storage medium; and
    a processor in communication with said storage medium and said memory, said processor executing machine readable instructions for performing the method of:

selecting at least one image quality attribute for a color marking device;

selecting at least one colorant set from among available colorant sets such that said colorant set improves said selected image quality attribute; and using a cluster model for color management of said color marking device, said cluster model comprising a plurality of clusters, each cluster having an associated transform which relates said image quality attribute to said selected colorant set of said color marking device.

8. The system of claim 7, wherein said selected colorant set is determined by an iterative process.

9. The system of claim 7, wherein said cluster model is designed for said color marking device, and is generated offline from measurements of said image quality attribute obtained from printed test patches and from color measurements obtained from said printed patches.

10. The system of claim 7, wherein each cluster of said cluster model is identified by a centroid in a selected color space.

11. The system of claim 10, wherein said selected color space is an input color space of said device.

12. The system of claim 10, wherein said selected color space is a device-independent color space.

* * * * *